United States Patent
Chen et al.

(10) Patent No.: US 12,367,139 B1
(45) Date of Patent: Jul. 22, 2025

(54) MEMORY CONTROL METHOD AND STORAGE DEVICE

(71) Applicant: Hosin Global Electronics Co., LTD, Shenzhen (CN)

(72) Inventors: Xiao Min Chen, Shenzhen (CN); Tsung-Lin Wu, Hsinchu (TW); Chao-Yu Chen, Shenzhen (CN); Qi Ming Zhu, Shenzhen (CN); Wu Du, Shenzhen (CN); Kai Qiang Meng, Shenzhen (CN); Hai Liang Wu, Shenzhen (CN); Jie Zhang, Shenzhen (CN); Wei Wang, Shenzhen (CN)

(73) Assignee: Hosin Global Electronics Co., LTD, Shenzhen (CN)

( * ) Notice: Subject to any disclaimer, the term of this patent is extended or adjusted under 35 U.S.C. 154(b) by 0 days.

(21) Appl. No.: 19/080,907

(22) Filed: Mar. 16, 2025

(30) Foreign Application Priority Data

May 31, 2024 (CN) .......................... 202410692544.2

(51) Int. Cl.
 *G06F 12/02* (2006.01)

(52) U.S. Cl.
 CPC .................. *G06F 12/0246* (2013.01)

(58) Field of Classification Search
 CPC .............. G06F 12/06; G06F 13/1684; G06F 2212/1032; G06F 2212/2022; G06F 12/0246; G11C 5/00; G11C 7/22; G11C 8/12
 See application file for complete search history.

(56) References Cited

U.S. PATENT DOCUMENTS

2007/0291552 A1* 12/2007 Khatami ............... G11C 16/20
 365/185.33
2009/0113121 A1* 4/2009 Lee ..................... G06F 12/0246
 711/E12.001

(Continued)

FOREIGN PATENT DOCUMENTS

CN 109407991 3/2019
CN 109407991 A * 3/2019 ........... G06F 3/0679

OTHER PUBLICATIONS

"Office Action of China Counterpart Application", issued on Jul. 9, 2024, p. 1-p. 9.

(Continued)

*Primary Examiner* — Tasnima Matin
(74) *Attorney, Agent, or Firm* — JCIPRNET

(57) ABSTRACT

Disclosed are a memory control method and a storage device. The storage device includes a memory controller and a memory module. The storage device is electrically connected to a host system. The memory control method includes: sending, by the host system, an identification instruction to the memory controller to obtain identification information of the memory module transmitted by the memory controller; generating a command sequence list corresponding to the memory module according to the identification information; transmitting the command sequence list to the memory controller; sending a corresponding invoke instruction to the memory controller according to execution requirements, for invoking and executing one of multiple command sequences in the command sequence list once or multiple times to control the memory module.

13 Claims, 5 Drawing Sheets

(56) References Cited

U.S. PATENT DOCUMENTS

| | | | |
|---|---|---|---|
| 2009/0198857 A1* | 8/2009 | Pyeon | G11C 8/12 |
| | | | 711/E12.001 |
| 2016/0162268 A1* | 6/2016 | Bush | G06F 8/66 |
| | | | 717/178 |
| 2017/0003967 A1* | 1/2017 | Lin | G06F 9/3802 |
| 2017/0371585 A1* | 12/2017 | Lazo | G06F 12/0246 |
| 2019/0266048 A1 | 8/2019 | Schauer et al. | |
| 2022/0011976 A1 | 1/2022 | Wu | |
| 2022/0253232 A1* | 8/2022 | Gyllenskog | G06F 3/0659 |

OTHER PUBLICATIONS

"Office Action of China Counterpart Application", issued on Aug. 17, 2024, p. 1-p. 11.
"Office Action of China Counterpart Application", issued on Sep. 4, 2024, with English translation thereof, p. 1-p. 26.

\* cited by examiner

| Predefined subcommands | Command field | Parameter field | Parameter field | Parameter field |
|---|---|---|---|---|
| FO_NOP | 0x00 | NU | NU | NU |
| FO_WAIT_FLASH_REDY | 0x01 | NU | NU | NU |
| FO_DELAY | 0x02 | Time unit | Delay time | |
| FO_SEND_CMD | 0x10 | Command | NU | NU |
| FO_SEND_ONE_ADDR | 0x11 | Address | NU | NU |
| FO_SEND_2_COL_ADDR | 0x12 | Address | | NU |
| FO_SEND_ROW_ADDR | 0x13 | NU | NU | NU |
| FO_ROW_ADDR_ADD | 0x14 | Incremented numeral value | | NU |
| FO_READ_N_BYTE | 0x20 | Number of bytes to be read | | NU |
| FO_READ_PAGE | 0x21 | Number of bytes to be read | | NU |
| FO_WRITE_N_BYTE | 0x22 | Number of bytes to be written | | NU |
| FO_WRITE_PAGE | 0x23 | Number of bytes to be written | | NU |
| FO_RESET_DATA_BUF_PTR | 0x24 | NU | NU | NU |
| FO_COUNT_TIME_START | 0x30 | NU | NU | NU |
| FO_COUNT_TIME_END | 0x31 | NU | NU | NU |
| FO_SET_BUF_DATA_ONE_BYTE | 0x40 | Data | NU | NU |
| FO_END | 0xFF | NU | NU | NU |

FIG. 5

MEMORY CONTROL METHOD AND STORAGE DEVICE

CROSS-REFERENCE TO RELATED APPLICATION

This application claims the priority benefit of China application serial no. 202410692544.2, filed on May 31, 2024. The entirety of the above-mentioned patent application is hereby incorporated by reference herein and made a part of this specification.

BACKGROUND

Technical Field

This disclosure relates to a memory management technology, particularly to a memory control method and storage device.

Description of Related Art

The advantages of non-volatile memory modules (such as flash memory modules) include non-volatile data retention, low power consumption, and rapid data access. Typically, a non-volatile memory module is controlled by a memory controller, which in turn connects to a host system via a connection interface. The host system issues commands to the memory controller, thereby enabling the memory controller to perform operations such as reading, writing, and erasing on the non-volatile memory module. However, there are numerous manufacturers of non-volatile memory modules, and each manufacturer might employ different operational commands. When a memory controller is required to adapt to non-volatile memory modules produced by various manufacturers, it necessitates the development of distinct firmware to accommodate these diverse operational commands. Moreover, even non-volatile memory modules manufactured by the same entity might utilize different operational commands due to variations in models or specifications. The aforementioned issues collectively contribute to an increase in the firmware development costs for memory controllers.

SUMMARY

This disclosure provides a memory control method that may reduce the cost of firmware development.

An embodiment of the present disclosure provides a memory control method for use in a host system, where the host system is electrically connected to a memory controller. The method includes: sending, by the host system, an identification instruction to the memory controller to obtain identification information of the memory module transmitted by the memory controller; generating a command sequence list corresponding to the memory module according to the identification information, wherein the command sequence list includes multiple command sequences and corresponding index values thereof, each of the multiple command sequences includes multiple subcommands; transmitting the command sequence list to the memory controller; sending a corresponding invoke instruction to the memory controller according to execution requirements, wherein the invoke instruction includes an index value and data parameters, used for invoking and executing one of the multiple command sequences in the command sequence list once or multiple times to control the memory module.

An embodiment of the present disclosure further provides a memory control method for use in a memory controller, where the memory controller is electrically connected to a host system and a memory module. The method includes: obtaining, by the memory controller, identification information of the memory module and transmitting the identification information to the host system in response to an identification instruction sent by the host system; receiving and storing a command sequence list corresponding to the memory module and generated by the host system, wherein the command sequence list includes multiple command sequences and corresponding index values thereof, each of the multiple command sequences includes multiple subcommands; selecting a corresponding command sequence from the command sequence list according to the index value in the invoke instruction in response to an invoke instruction sent by the host system; parsing the corresponding command sequence to obtain the subcommands included therein, and controlling the memory module according to the data parameters in the invoke instruction and the obtained subcommands.

From another perspective, an embodiment of this disclosure provides a storage device, including a connection interface unit for connecting to a host system; a memory module; and a memory controller connected to the connection interface unit and the memory module; wherein the memory controller is configured to obtain identification information of the memory module and transmit the identification information to the host system in response to an identification instruction sent by the host system; to receive and store a command sequence list corresponding to the memory module and generated by the host system, wherein the command sequence list includes multiple command sequences and corresponding index values thereof, each of the multiple command sequences includes multiple subcommands; to select a corresponding command sequence from the command sequence list according to the index value in the invoke instruction in response to an invoke instruction sent by the host system; to parse the corresponding command sequence to obtain the subcommands included therein, and to control the memory module according to the data parameters in the invoke instruction and the obtained subcommands.

Through the memory control method provided by the present disclosure, the memory controller does not need to identify the model and operational command format of the memory, but only needs to identify predefined subcommands. Therefore, developing a single set of firmware may be compatible with different models of memory, and there is no limitation on the compatible memory models, thus significantly reducing the cost of firmware development.

BRIEF DESCRIPTION OF THE DRAWINGS

FIG. 5 is a schematic view illustrating a predefined subcommand table according to an embodiment.

DESCRIPTION OF THE EMBODIMENTS

Figure 1:
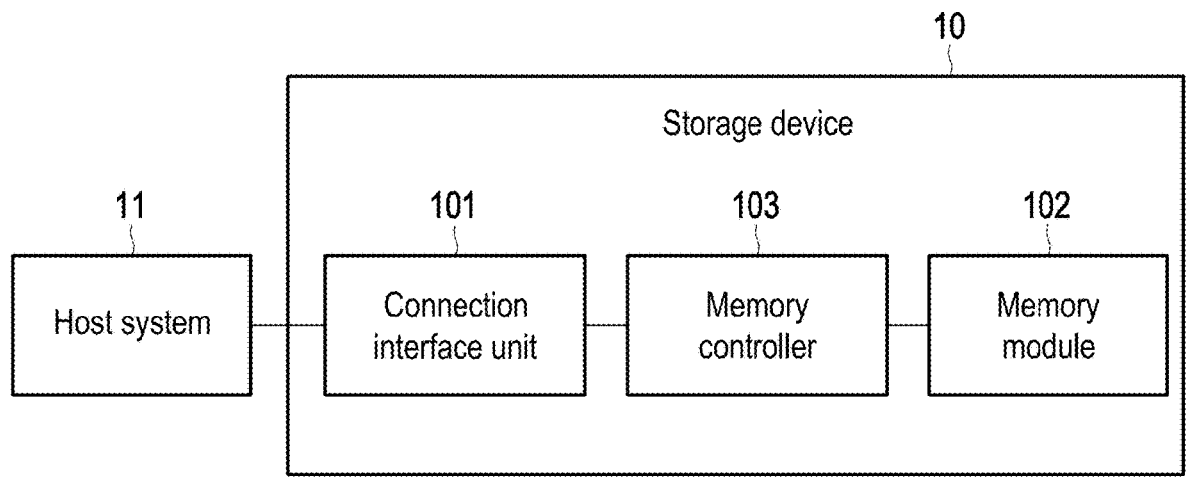
FIG. 1 is a schematic view of a storage device according to an embodiment of this disclosure.

Reference will now be made in detail to exemplary embodiments of this disclosure, examples of which are illustrated in the accompanying drawings. Wherever possible, the same reference numbers are used in the drawings and the description to refer to the same or similar parts.

FIG. 1 is a schematic view illustrating a storage device according to an embodiment of this disclosure. Referring to FIG. 1, the data storage system includes a storage device 10 and a host system 11. The host system 11 may be any type of computer system, such as a smartphone, a tablet computer, a notebook computer, a desktop computer, an industrial computer, a game console, server, or an in-vehicle computer, etc., and the type of the host system 11 is not limited to these examples.

The storage device 10 is connected to the host system 11 and is configured to store data from the host system 11. For example, the storage device 10 may include a solid-state drive, a USB flash drive, a memory card, or other types of non-volatile storage devices. The host system 11 may communicate with the storage device 10 through connection interface standards such as embedded Multi-Media Card (eMMC), Universal Flash Storage (UFS), Peripheral Component Interconnect Express (PCI Express), Non-Volatile Memory Express (NVM Express), Serial Advanced Technology Attachment (SATA), Universal Serial Bus (USB), or other types of connection interface standards. Therefore, the host system 11 may store data to the storage device 10 and/or read data from the storage device 10.

The storage device 10 includes a connection interface unit 101, a memory module 102, and a memory controller 103. The connection interface unit 101 is configured to connect the storage device 10 to the host system 11. For example, the connection interface unit 101 may support connection interface standards such as eMMC, UFS, PCI Express, NVM Express, SATA, PCI Express, or USB. The storage device 10 may communicate with the host system 11 via the connection interface unit 101 (e.g., exchanging signals, instructions, and/or data).

The memory module 102 is configured to store data. The memory module 102 may include one or more rewritable non-volatile memory modules. Each rewritable non-volatile memory module may include one or more storage unit arrays. The storage units in the storage unit array store data in the form of voltage (also known as threshold voltage). For example, the memory module 102 may include Single Level Cell (SLC) NAND flash memory modules, Multi Level Cell (MLC) NAND flash memory modules, Triple Level Cell (TLC) NAND flash memory modules, Quad Level Cell (QLC) NAND flash memory modules, and/or other memory modules with the same or similar characteristics.

The memory controller 103 is connected to the connection interface unit 101 and the memory module 102. The memory controller 103 may be considered as the control core of the storage device 10 and is configured to control the storage device 10. For example, the memory controller 103 may be responsible for controlling and/or managing all or part of the operations of the storage device 10. For instance, the memory controller 103 may include a Central Processing Unit (CPU), or other programmable general-purpose or special-purpose microprocessors, Digital Signal Processors (DSP), programmable controllers, Application Specific Integrated Circuits (ASIC), Programmable Logic Devices (PLD), or other similar devices or combinations of these devices. In an embodiment, the memory controller 103 includes a flash memory controller.

In an embodiment, the memory controller 103 may further include a buffer memory, a power management circuit, an encoding circuit, a decoding circuit, and/or other types of various circuit modules, which is not limited in the present disclosure. The buffer memory is configured to cache data. The power management circuit is configured to manage the power supply of the storage device 10. The encoding circuit is configured to encode the data to be stored in the memory module 102 to generate error correction code (and/or error checking code). The decoding circuit is configured to decode the data read from the memory module 102 to correct possible errors in the read data. For example, the encoding circuit and/or decoding circuit may use various encoding/decoding algorithms such as Low Density Parity Check code (LDPC code), BCH code, Reed-Solomon code (RS code), Exclusive OR (XOR) code, etc. to encode and decode data.

The memory module 102 may receive commands from the memory controller 103 and access storage units according to the commands. For example, when data is to be stored, the memory controller 103 may send a write command to the memory module 102 to instruct the memory module 102 to store data in specific storage units. When data is to be read, the memory controller 103 may send a read command to the memory module 102 to instruct the memory module 102 to read data from specific storage units. When data is to be deleted, the memory controller 103 may send an erase command to the memory module 102 to instruct the memory module 102 to erase data stored in specific storage units. In addition, the memory controller 103 may send other types of commands to the memory module 102 to instruct the memory module 102 to perform corresponding operations, which is not limited in the present disclosure.

Figure 2:
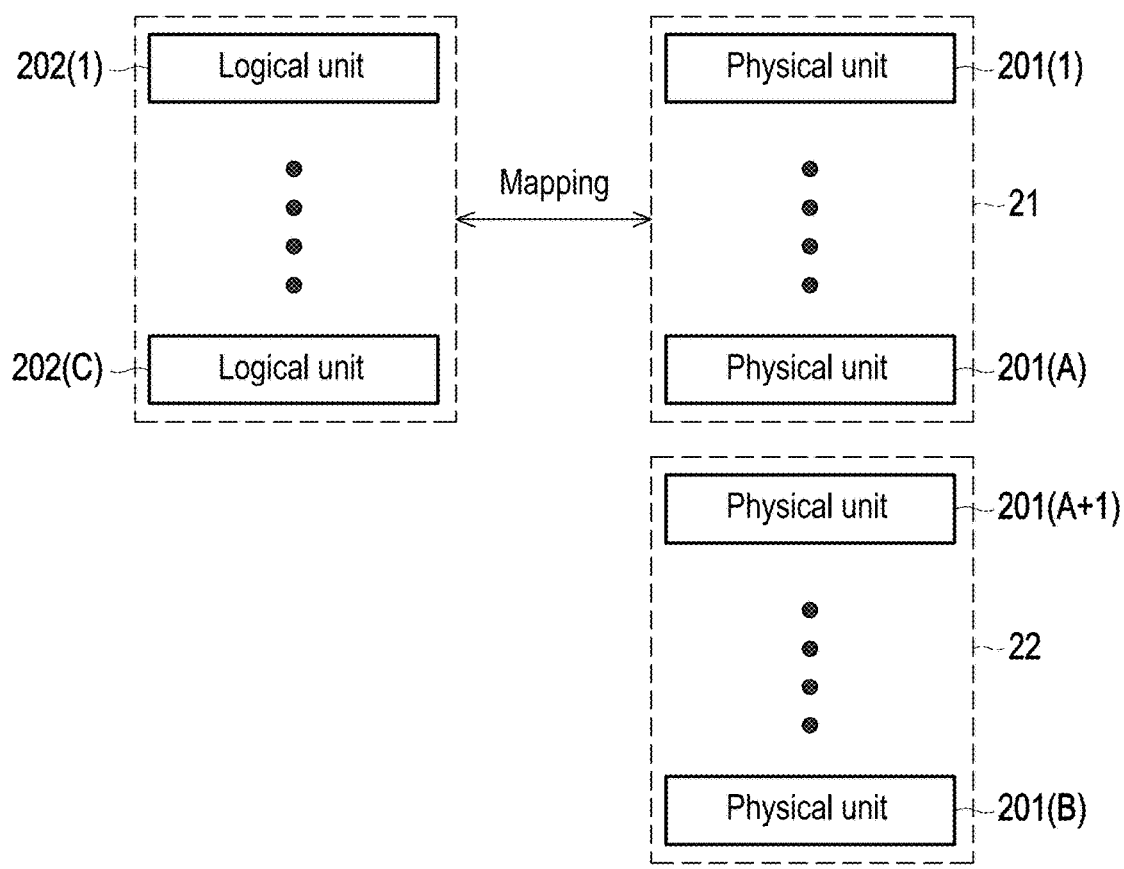
FIG. 2 is a schematic view illustrating the management of a memory module according to an embodiment of this disclosure.

FIG. 2 is a schematic view illustrating the management of a memory module according to an embodiment of this disclosure. Referring to FIG. 1 and FIG. 2, the memory module 102 includes multiple physical units 201(1) to 201(B). Each physical unit includes multiple storage units and is configured to non-volatilely store data.

In an embodiment, a physical unit may include one or more physical erase units. A physical erase unit may include multiple physical programmable units. For example, a physical programmable unit may include multiple physical sectors. For instance, the data capacity of one physical sector may be 512 bytes (B), and a physical programmable unit may include 8 physical sectors. However, the data capacity of one physical sector and/or the total number of physical sectors included in one physical programmable unit may be adjusted according to practical requirements, which is not limited in the present disclosure. In an embodiment, a physical programmable unit may be considered as a physical page. For example, the data capacity of one physical programmable unit may be 4 kilobytes (4 KB), and this disclosure is not limited thereto.

In an embodiment, a physical programmable unit is the minimum unit for synchronously writing data in the memory module 102. For example, when performing a programming operation on a physical programmable unit to write data to this physical programmable unit, multiple storage units in this physical programmable unit may be synchronously programmed to store corresponding data. For instance, when programming a physical programmable unit, a write voltage may be applied to this physical programmable unit to change the threshold voltage of at least some storage units in this physical programmable unit. The threshold voltage of each storage unit may reflect the bit data stored in the storage unit. In the following embodiments, a physical programmable unit is also referred to as a physical subunit.

In an embodiment, multiple storage units in the same physical erase unit may be synchronously erased. For example, when performing an erase operation on a physical erase unit, an erase voltage may be applied to multiple physical programmable units in this physical erase unit to change the threshold voltage of at least some storage units in these physical programmable units and clear the bit data stored in each storage unit of these physical programmable units.

In an embodiment, the memory controller 103 may logically associate the physical units 201(1) to 201(A) with the data area 21 and associate the physical units 201(A+1) to 201(B) with the spare area 22. The physical units 201(1) to 201(A) in the data area 21 are configured to store data (also referred to as user data) from the host system 11. For example, each physical unit in the data area 21 may store valid data and/or invalid data. Furthermore, the physical units 201(A+1) to 201(B) in the spare area 22 do not store data.

In an embodiment, if a physical unit does not store valid data, this physical unit may be associated with the spare area 22. In an embodiment, the spare area 22 is also referred to as a free pool. Furthermore, the physical unit associated with the spare area 22 may be erased to clear the data in this physical unit.

In an embodiment, when there is data (i.e., user data) from the host system 11 that needs to be stored, the memory controller 103 may select one or more physical units from the spare area 22 and instruct the memory module 102 to store the data from the host system 11 into the selected physical units. Meanwhile, the selected physical units may be associated with the data area 21.

In an embodiment, the memory controller 103 may configure multiple logical units 202(1) to 202(C) to map the physical units 201(1) to 201(A) in the data area 21. For example, one logical unit may correspond to one logical block address (LBA) or other logical management unit. A logical unit may be mapped to one or more physical units in the data area 21.

In an embodiment, if a physical unit is currently mapped by any logical unit, the memory controller 103 may determine that the data currently stored in this physical unit includes valid data. Conversely, if a physical unit is not currently mapped by any logical unit, the memory controller 103 may determine that this physical unit currently does not store any valid data (and/or all data in this physical unit is invalid data).

In an embodiment, the memory controller 103 may record the mapping relationship between logical units and physical units in a logical-to-physical mapping table. When receiving an access instruction (such as a read instruction, a write instruction, a delete instruction, or other type of instructions) from the host system 11, the memory controller 103 may instruct the memory module 102 to execute corresponding operations according to the information in this logical-to-physical mapping table.

In an embodiment, the memory controller 103 may configure one logical block number (LBN) for each logical unit. A specific logical block number may be provided to represent a specific logical unit. Different logical block numbers may be used to represent different logical units. In an embodiment, the memory controller 103 may use this logical block number to manage various logical units.

In an embodiment, a logical unit may include multiple logical subunits. In an embodiment, the memory controller 103 may configure one logical page number (LPN) for each logical subunit in the logical unit. In an embodiment, the memory controller 103 may use the logical block number in combination with the logical page number to manage the logical subunits in various logical units. For example, the memory controller 103 may use a logical block number of "1" combined with a logical page number of "2" to represent the second logical subunit in the first logical unit, and so on.

Figure 3:
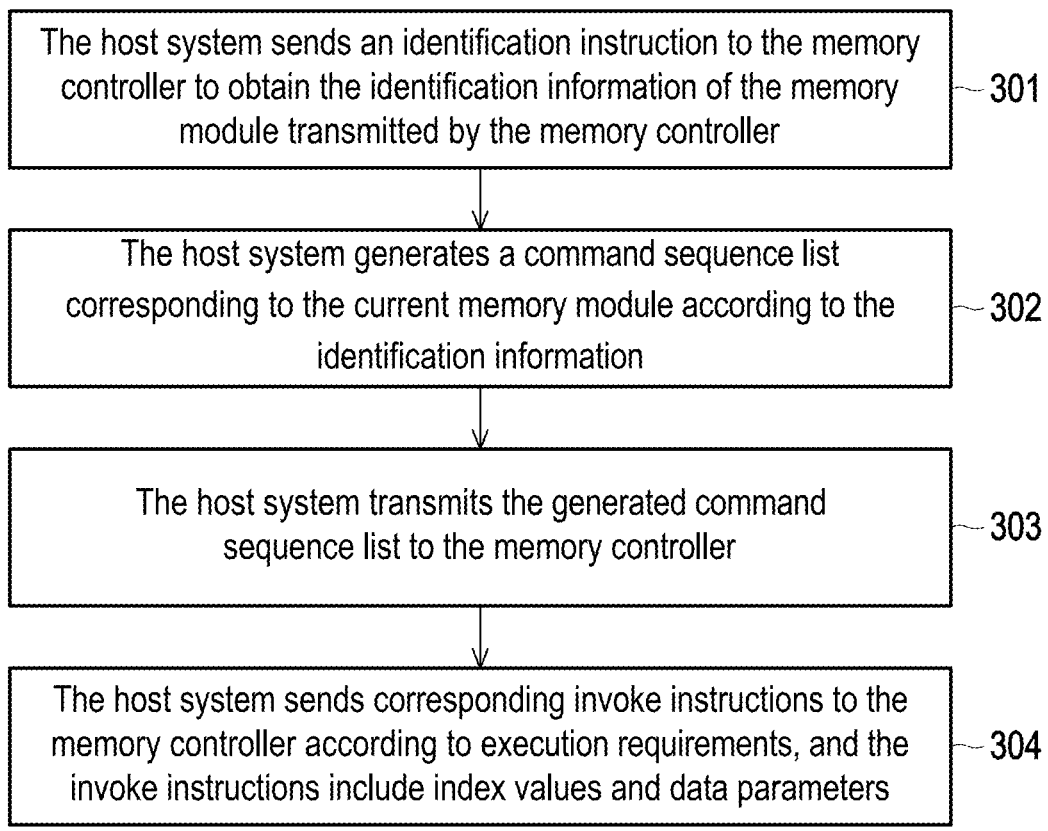
FIG. 3 is a flowchart illustrating a memory control method according to an embodiment.

The first aspect of an embodiment of the present disclosure provides a memory control method for the host system 11. FIG. 3 is a flowchart illustrating the memory control method according to an embodiment. Referring to FIG. 1 and FIG. 3, in step 301, the host system 11 sends an identification instruction to the memory controller 103 to obtain the identification information of the memory module 102 transmitted by the memory controller 103. This identification information may be, for example, the flash ID of the memory module 102. In other embodiments, the identification information may also include information such as the manufacturer, product name, specifications, etc. of the memory module 102. This disclosure is not limited in this regard.

In step 302, the host system 11 generates a command sequence list corresponding to the current memory module 102 according to the aforementioned identification information.

Figure 4:
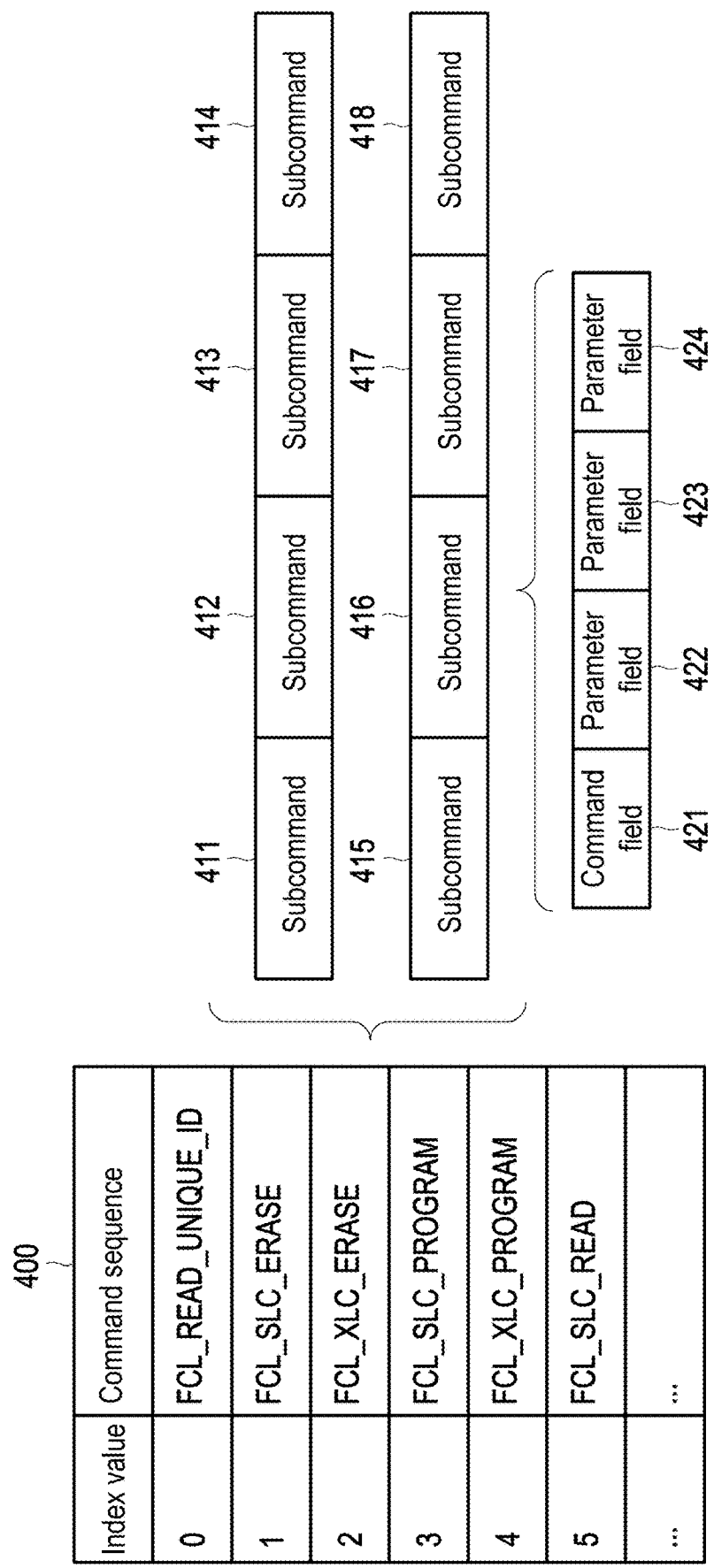
FIG. 4 is a schematic view illustrating a command sequence list according to an embodiment.

For example, FIG. 4 is a schematic view illustrating a command sequence list according to an embodiment. Referring to FIG. 4, the command sequence list 400 contains multiple command sequences, each command sequence having a corresponding index value. For simplicity, the command sequence list 400 only shows a portion of the command sequences. For example, the index value "0" corresponds to the command sequence "FCL_READ_UNIQUE_ID", which is provided to read the unique identifier of the flash; the index value "1" corresponds to the command sequence "FCL_SLC_ERASE", which is provided to erase the physical unit in SLC mode; the index value "2" corresponds to the command sequence "FCL_XLC_ERASE", which is provided to erase the physical unit in MLC, TLC, QLC and other modes; the index value "3" corresponds to the command sequence "FCL_SLC_PROGRAM", which is provided to execute programming (or writing) according to SLC mode; the index value "4" corresponds to the command sequence "FCL_XLC_PROGRAM", which is provided to execute programming (or writing) according to MLC, TLC, QLC and other modes; the index value "5" corresponds to the command sequence "FCL_SLC_READ", which is provided to read the physical unit in SLC mode. In the present embodiment, the index value is set to decimal, while in other embodiments the index value may be binary, octal, hexadecimal or other bases. This disclosure does not impose any limitations in this regard.

Each command sequence includes multiple subcommands, for example, the command sequence "FCL_XLC_ERASE" includes subcommands 411 to 418. Each subcommand includes one command field 421 and three parameter fields 422 to 424. The command field 421 is configured to store the op code, while the parameter fields 422 to 424 are configured to store the execution parameters required for executing the commands. In some embodiments, the command sequence list 400 may include up to 32 command sequences, and each command sequence may include up to 128 subcommands. Each subcommand may be 4 Bytes in size, with the command field 421 being 1 Byte in size, and each parameter field 422 to 424 being 1 Byte in size. However, this disclosure does not limit the number and content of command sequences, nor does it limit the number of subcommands in each command sequence, or the size of each subcommand.

The aforementioned subcommands are selected from a predefined subcommand table, which is a set of universal command sets that may be identified by both the host system 11 and the memory controller 103. For different models of memory modules 102, the host system 11 adapts to different operational command formats by setting execution parameters in the predefined subcommands and combining different predefined subcommands. As shown in Table 500 in FIG. 5, Table 500 illustrates multiple predefined subcommands, each predefined subcommand including 1 command field and 3 parameter fields. The command field stores the op code, the parameter fields store the execution parameters, and "NU" indicates that the corresponding execution parameter is empty. For example, the subcommand with op code "0x02" is configured to set a delay, the first parameter field is configured to set whether microseconds are used as the time unit, and the second and third parameter fields are configured to record the delay time. For simplicity, Table 500 only shows a portion of the predefined subcommands. This disclosure does not limit the content and quantity of predefined subcommands. In this example, the op code may not be modified, and the format of the subcommand (including the number of fields, the length and content of each field) may not be modified. The host system 11 may determine the execution parameters of the subcommands, but after generating the command sequence list, these execution parameters of the subcommands may not be modified. In this embodiment, the command field and parameter fields are set to hexadecimal, while in other embodiments they may be binary, octal, decimal or other bases. This disclosure does not impose any limitations in this regard.

The host system 11 determines the operational command format corresponding to the current memory module 102 according to the identification information, selects one or more of the multiple predefined subcommands to form each command sequence in the command sequence list, and determines the execution parameters of the multiple predefined subcommands according to the operational command format. For example, the command sequence "FCL_SLC_ERASE" includes subcommands with op codes 0x10, 0x13, 0x30, 0x02, 0x01, 0x31, 0x14, and 0xFF. Similarly, the host system 11 may select other suitable predefined subcommands for other command sequences.

The same command sequence may include multiple predefined subcommands with identical op codes, and the execution parameters of these predefined subcommands may be the same or different. Different command sequences may also include predefined subcommands with identical op codes, and the execution parameters of these predefined subcommands may be the same or different. In other words, the host system 11 combines the predefined subcommands to form the command sequences that the host system 11 needs, and these combinations of the subcommands need to comply with the construction rules and the execution format of the memory module 102. For example, one model of memory module 102 may read 4k of data at a time, while another model of memory module 102 may read 2k of data at a time. The host system 11 may design the execution parameters of the subcommands accordingly to generate different command sequence lists.

For different models of memory modules 102, the predefined subcommands forming command sequences that implement the same function may also be different. For example, the command sequence "FCL_SLC_ERASE" generated for two different models of memory modules 102 may contain different quantities, sequences, or types of subcommands.

Please refer back to FIG. 3. In step 303, the host system 11 transmits the generated command sequence list to the memory controller 103, and this command sequence list may be stored in the memory controller 103.

In some embodiments, if the host system adds, modifies, or deletes command sequences in the current command sequence list, the host system may generate a new command sequence list and transmit the new command sequence list to the memory controller 103 to replace the current command sequence list. The command sequence list may not be added to, modified, or deleted by the memory controller 103.

In step 304, the host system 11 sends corresponding invoke instructions to the memory controller 103 according to execution requirements. These invoke instructions include index values and data parameters. The index value corresponds to a command sequence in the command sequence list, configured to invoke and execute one of the multiple command sequences in the command sequence list once or multiple times to control the memory module 102. Taking the command sequence list in FIG. 4 as an example, when the host system 11 needs to execute the command sequence "FCL_SLC_ERASE", the host system 11 may set the index value in the invoke instruction to 1, and the data parameters may include, for example, the address of the logical unit. Alternatively, when the host system 11 needs to execute the command sequence "FCL_SLC_READ", the host system 11 may set the index value in the invoke instruction to 5, and the data parameters may include, for example, the address of the target block or page. Or when the host system 11 needs to read a large amount of data at once, the host system 11 may set the index value in the invoke instruction to 5 to invoke and execute the command sequence "FCL_SLC_READ" multiple times, and the data parameters may include, for example, the number of executions, the address of the target block or page.

The second aspect of an embodiment of the present disclosure provides a memory control method for the memory controller 103. After the host system 11 executes step 301 to send an identification instruction to the memory controller 103, the memory controller 103 obtains the identification information of the memory module 102 and transmitting the identification information to the host system 11 in response to the identification instruction sent by the host system 11.

After the host system 11 executes step 303 to send the command sequence list to the memory controller 103, the memory controller 103 receives and stores the command sequence list corresponding to the memory module 102 and generated by the host system 11. The command sequence list includes multiple command sequences and corresponding index values thereof, with each of the multiple command sequences containing multiple subcommands. For specific details about the command sequence list, command sequences, and subcommands, please refer to the above description, which may not be repeated here.

After the host system 11 executes step 304 to send corresponding invoke instruction to the memory controller 103 according to execution requirements, the memory controller 103 selects the corresponding command sequence from the command sequence list according to the index value in the invoke instruction in response to the invoke instruction sent by the host system.

Figure 6:
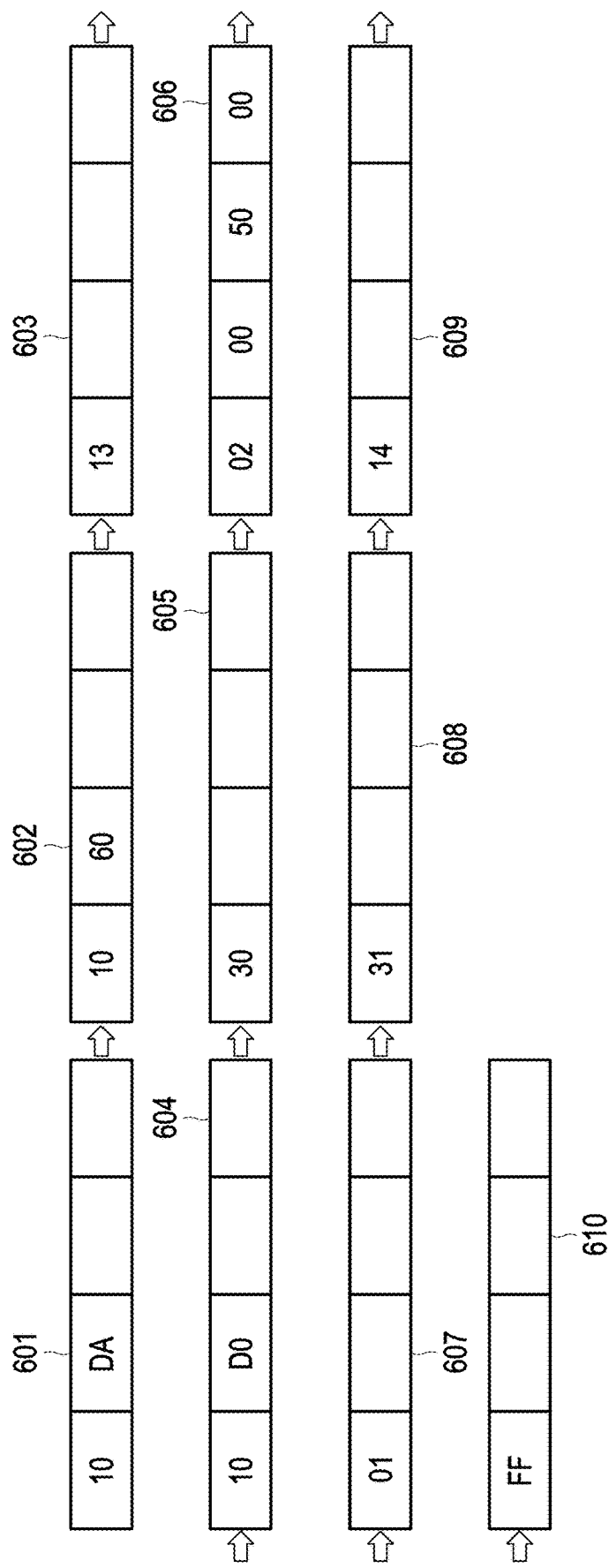
FIG. 6 is a schematic view illustrating the subcommands included in a command sequence according to an embodiment.

Additionally, after the memory controller 103 obtains the command sequence corresponding to the aforementioned index value, the memory controller 103 parses the corresponding command sequence to obtain the subcommands included therein, and controls the memory module 102 according to the data parameters in the invoke instruction and the obtained subcommands. In continuation with the previous example, when the index value is 1, the memory controller 103 may query the command sequence list based on this index value to obtain the subcommands included in the command sequence "FCL_SLC_ERASE". Please refer to FIG. 6. In this example, the command sequence "FCL_SLC_ERASE" includes subcommands 601 to 610, with each subcommand 601 to 610 containing four fields. The first field records the op code, and the following three fields record the execution parameters (the numbers in the fields in FIG. 6 are all hexadecimal). If no value is recorded in a field, it means that this field is invalid. In this embodiment, the command fields and parameter fields are set to hexadecimal. In other embodiments, they may be binary, octal, decimal, or other number systems. This disclosure does not impose any limitations in this regard.

First, the op code for subcommand 601 is "10", which means that an instruction should be sent to the memory module 102. The instruction to be sent is "DA", which represents the pre-instruction for SLC. The op code for the subcommand 602 is "10", meaning that an instruction should be sent to the memory module 102. The instruction to be sent is "60", which is the first instruction for executing an erase operation. The op code for the subcommand 603 is "13", meaning that a row address should be sent to the memory module 102. The corresponding data parameter is obtained from the invoke instruction as the row address. The op code for the subcommand 604 is "10", meaning that an instruction should be sent to the memory module 102. The instruction to be sent is "D0", which represents the second instruction for executing an erase operation. The op code for the subcommand 605 is "30", which means the start of the timer. The op code for the subcommand 606 is "02", which is configured to set a delay. The value "00" indicates that the time unit is nanoseconds (ns), and the value "50 00" indicates a delay of 0x0050 (80 in decimal) time units. The op code for the subcommand 607 is "01", which means waiting for the memory module 102 to be ready. The op code for the subcommand 608 is "31", which means that the timer stops and saves the timing duration. The op code for the subcommand 609 is "14", which means incrementing the row address. This subcommand is configured for repeated invoking to this command sequence. If the object to be executed in the next invoking to this command sequence is on the same plane, the parameter field may be filled with the value "0040". If the object to be executed in the next invoking to this command sequence is on a different plane, the parameter field may be filled with "0010". Finally, the op code for the subcommand 610 is "FF", which means the end of this command sequence.

In the above example, the command sequence "FCL_SLC_ERASE" includes 10 subcommands 601 to 610. However, in other storage devices 12, if the model of the memory module 102 changes, the host system 11 may generate another command sequence list, in which the command sequence "FCL_SLC_ERASE" may include different subcommands. Specifically, after the memory controller 103 transmits the identification information of the memory module 102 to the host system 11, if the host system 11 determines that this identification information is the first identification information (for example, a model), the host system 11 may generate a first command sequence list and transmit the first command sequence list to the memory controller 103. If the host system 11 determines that the received identification information is the second identification information (for example, another model), the host system 11 may generate a second command sequence list and transmit the second command sequence list to the memory controller 103. The first command sequence list is different from the second command sequence list. In some embodiments, the order of command sequences in the first command sequence list may be different from the order of command sequences in the second command sequence list. For example, the index value of the command sequence "FCL_SLC_ERASE" in the first command sequence list may be 1, but the index value of the same command sequence in the second command sequence list may be 3. In some embodiments, the quantity of command sequences in the first command sequence list may be different from the quantity of command sequences in the second command sequence list. For example, the first command sequence list includes 28 command sequences, while the second command sequence list includes 31 command sequences.

In some embodiments, subcommands in the first command sequence list and the second command sequence list may have different parameters. Using the command sequence "FCL_SLC_ERASE" as an example again, in the first command sequence list, the command sequence "FCL_SLC_ERASE" (also referred to as the first command sequence) includes the subcommand "10 DA 00 00" (also referred to as the first subcommand), which may be referred to in FIG. 6 as the subcommand 601. However, in the second command sequence list, the command sequence "FCL_SLC_ERASE" (also referred to as the second command sequence) may include the subcommand "10 3B 00 00" (also referred to as the second subcommand), which means that the op code of the first subcommand is the same as the op code of the second subcommand, but the parameter of the first subcommand is different from the parameter of the second subcommand.

The memory controller 103 is not allowed to add, modify, or delete command sequences in the command sequence list. In some embodiments, the host system 11 may add, modify, or delete command sequences in the current command sequence list to generate a new command sequence list and transmit the new command sequence list to the memory controller 103. After receiving the new command sequence list, the memory controller 103 may store the most recently received command sequence list to replace the current command sequence list. For example, the current command sequence list includes 28 command sequences, while the new command sequence list includes 32 command sequences.

From another perspective, the third aspect of an embodiment of the present disclosure provides a storage device 10, including a connection interface unit 101, configured to connect to a host system 11; a memory module 102; and a memory controller 103, connected to the connection interface unit 101 and the memory module 102.

The memory controller 103 is configured to obtain identification information of the memory module 102 and transmit the identification information to the host system 11 in response to an identification instruction sent by the host system 11; configured to receive and store a command sequence list corresponding to the memory module 102 and generated by the host system 11, wherein the command sequence list includes multiple command sequences and corresponding index values thereof, each of the multiple command sequences includes multiple subcommands; configured to select the corresponding command sequence in the command sequence list according to the index value in the invoke instruction in response to an invoke instruction sent by the host system 11; configured to parse the corresponding command sequence to obtain the subcommands included therein, and to control the memory module 102 according to the data parameters in the invoke instruction and the obtained subcommands. The specific implementation steps are as described above, and will not be repeated here.

Through the above means, for different models of the memory module 102, the host system 11 may generate corresponding command sequence lists and transmit the corresponding command sequence lists to the memory controller 103. In subsequent operations, the host system 11 only needs to transmit the index value of the command sequence to invoke the corresponding command sequence. As a result, the firmware of the memory controller 103 only needs to identify the predefined subcommand table to control different models of the memory module 102 according to the command sequence list transmitted by the host system 11, without the need to burn different firmware in response to different models of the memory module 102, which may reduce the development cost and complexity of the firmware. The above means may also be applicable to different connection interface standards, such as USB, SATA, PCIE, etc. In addition, the memory module 102 may have different specifications, such as single-plane and multi-plane, and the above means may be applicable to various different specifications.

Finally, it should be noted that: the above embodiments are only used to illustrate the technical solutions of the present disclosure, and are not intended to limit them; although the present disclosure has been described in detail with reference to the foregoing embodiments, those skilled in the art should understand that: they may still modify the technical solutions described in the foregoing embodiments, or make equivalent replacements to part or all of the technical features; and these modifications or replacements do not cause the essence of the corresponding technical solutions to deviate from the scope of the technical solutions in the embodiments of the present disclosure.

What is claimed is:

1. A memory control method for use in a host system, wherein the host system is electrically connected to a memory controller, the method comprising:
    sending, by the host system, an identification instruction to the memory controller to obtain identification information of a memory module transmitted by the memory controller;
    generating a command sequence list corresponding to the memory module according to the identification information, wherein the command sequence list comprises a plurality of command sequences and corresponding index values thereof, each of the plurality of command sequences comprises a plurality of subcommands; wherein the plurality of subcommands are selected from a predefined subcommand table, the predefined subcommand table comprises a plurality of predefined subcommands, the predefined subcommand table is a universal command set that is preset and is able to be identified by both the host system and the memory controller; wherein when it is determined that the identification information is first identification information, a first command sequence list is generated as the command sequence list; when it is determined that the identification information is second identification information, a second command sequence list is generated as the command sequence list, the first command sequence list is different from the second command sequence list, wherein one command sequence of the first command sequence list and one command sequence of the second command sequence list implement a same function but comprise the predefined subcommands that are different from each other;
    transmitting the command sequence list to the memory controller;
    sending a corresponding invoke instruction to the memory controller according to execution requirements, wherein the invoke instruction comprises an index value and data parameters, used for invoking and executing one of the plurality of command sequences in the command sequence list once or a plurality of times to control the memory module.

2. The memory control method according to claim 1, wherein the step of generating the command sequence list corresponding to the memory module according to the identification information comprises:
    determining an operational command format corresponding to the memory module according to the identification information;
    selecting one or more from the predefined subcommand table to form each command sequence in the command sequence list, and determining execution parameters in the predefined subcommands according to the operational command format.

3. The memory control method according to claim 1, wherein the first command sequence list being different from the second command sequence list comprises:
    a sequence of the plurality of command sequences in the first command sequence list is different from a sequence of the plurality of command sequences in the second command sequence list; or
    a quantity of the plurality of command sequences in the first command sequence list is different from a quantity of the plurality of command sequences in the second command sequence list.

4. The memory control method according to claim 1, wherein the first command sequence list being different from the second command sequence list comprises:
    a first command sequence of the first command sequence list comprises a first subcommand, and a second command sequence of the second command sequence list comprises a second subcommand;
    wherein an op code of the first subcommand is the same as an op code of the second subcommand, and execution parameters of the first subcommand are different from execution parameters of the second subcommand.

5. The memory control method according to claim 2, wherein the predefined subcommands comprise a command field and a parameter field:
    the command field comprises an op code, provided to indicate a type of each of the predefined subcommands;
    the parameter field comprises the execution parameters, provided to indicate an execution format of each of the predefined subcommands.

6. The memory control method according to claim 1, further comprising:
    when the host system adds, modifies, or deletes a command sequence in a current command sequence list, a new command sequence list is generated and transmitted to the memory controller to replace the current command sequence list.

7. A memory control method for use in a memory controller, wherein the memory controller is electrically connected to a host system and a memory module, the method comprising:
    obtaining, by the memory controller, identification information of the memory module and transmitting the identification information to the host system in response to an identification instruction sent by the host system;
    receiving and storing a command sequence list corresponding to the memory module and generated by the host system, wherein the command sequence list comprises a plurality of command sequences and corresponding index values thereof, each of the plurality of command sequences comprises a plurality of subcommands; when the identification information is first identification information, the command sequence list is a first command sequence list; when the identification information is second identification information, the command sequence list is a second command sequence list, wherein
    the plurality of subcommands are selected from a predefined subcommand table, the predefined subcommand table comprises a plurality of predefined subcommands, the predefined subcommand table is a universal command set that is preset and is able to be identified by both the host system and the memory controller, wherein one command sequence of the first command sequence list and one command sequence of the second command sequence list implement a same function but comprise the predefined subcommands different from each other;
    selecting a corresponding command sequence from the command sequence list according to an index value in an invoke instruction in response to the invoke instruction sent by the host system; and
    parsing the corresponding command sequence to obtain subcommands comprised therein, and controlling the memory module according to data parameters in the invoke instruction and the obtained subcommands.

8. The memory control method according to claim 7, wherein after receiving and storing the command sequence list corresponding to the memory module and generated by the host system, the method further comprising:
    if a new command sequence list sent by the host system is received, a most recently received command sequence list is stored to replace a current command sequence list.

9. The memory control method according to claim 7, further comprising:
    the memory controller is not allowed to add, modify or delete the command sequences in the command sequence list.

10. A storage device, comprising:
    a connection interface unit for connecting to a host system;
    a memory module; and
    a memory controller connected to the connection interface unit and the memory module;
    wherein the memory controller is configured to obtain identification information of the memory module and transmit the identification information to the host system in response to an identification instruction sent by the host system;
    configured to receive and store a command sequence list corresponding to the memory module and generated by the host system, wherein the command sequence list comprises a plurality of command sequences and corresponding index values thereof, each of the plurality of command sequences comprises a plurality of subcommands; when the identification information is first identification information, the command sequence list is a first command sequence list;
    when the identification information is second identification information, the command sequence list is a second command sequence list, the first command sequence list is different from the second command sequence list, wherein the plurality of subcommands are selected from a predefined subcommand table, the predefined subcommand table comprises a plurality of predefined subcommands, the predefined subcommand table is a universal command set that is preset and is able to be identified by both the host system and the memory controller, wherein one command sequence of the first command sequence list and one command sequence of the second command sequence list implement a same function but comprise the predefined subcommands different from each other;
    configured to select a corresponding command sequence from the command sequence list according to an index value in an invoke instruction in response to the invoke instruction sent by the host system; and
    configured to parse the corresponding command sequence to obtain subcommands comprised therein, and to control the memory module according to data parameters in the invoke instruction and the obtained subcommands.

11. The storage device according to claim 10, wherein the first command sequence list being different from the second command sequence list comprises:
    a sequence of the plurality of command sequences in the first command sequence list is different from a sequence of the plurality of command sequences in the second command sequence list; or
    a quantity of the plurality of command sequences in the first command sequence list is different from a quantity of the plurality of command sequences in the second command sequence list.

12. The storage device according to claim 10, wherein the first command sequence list being different from the second command sequence list further comprises:
    a first command sequence of the first command sequence list comprises a first subcommand, and a second command sequence of the second command sequence list comprises a second subcommand;
    wherein an op code of the first subcommand is the same as an op code of the second subcommand, and execution parameters of the first subcommand are different from execution parameters of the second subcommand.

13. The storage device according to claim 10, further comprising:
    the memory controller is not allowed to add, modify or delete the command sequences in the command sequence list.

* * * * *